United States Patent [19]

Kabayama

[11] Patent Number: 4,821,858
[45] Date of Patent: Apr. 18, 1989

[54] RELEASE MECHANISM FOR A CLUTCH

[75] Inventor: Yoshiaki Kabayama, Hirakata, Japan

[73] Assignee: Kabushiki Kaisha Daikin Seisakusho, Osaka, Japan

[21] Appl. No.: 168,126

[22] PCT Filed: Jul. 6, 1987

[86] PCT No.: PCT/JP87/00473

§ 371 Date: Feb. 2, 1988

§ 102(e) Date: Feb. 2, 1988

[87] PCT Pub. No.: WO88/00660

PCT Pub. Date: Jan. 28, 1988

[30] Foreign Application Priority Data

Jul. 10, 1986 [JP] Japan .................. 61-162846

[51] Int. Cl.$^4$ .............................. F16D 23/12
[52] U.S. Cl. .................... 192/91 R; 74/516; 192/99 S
[58] Field of Search .......... 192/99 S, 99 R, 91 R, 192/85 C; 74/516

[56] References Cited

U.S. PATENT DOCUMENTS

| 2,490,555 | 12/1949 | Songer ........................ 74/516 |
| 2,977,817 | 4/1961 | Panasewicz ................... 74/516 |
| 3,738,460 | 6/1973 | Murakami et al. ........ 192/91 R X |
| 3,756,361 | 9/1973 | Persson et al. ........... 192/91 R X |

FOREIGN PATENT DOCUMENTS

| 304051 | 12/1932 | Italy ...................... 192/99 S |
| 51-59745 | 11/1974 | Japan . |
| 58-147026 | 10/1983 | Japan . |

Primary Examiner—Rodney H. Bonck
Attorney, Agent, or Firm—Armstrong, Nikaido, Marmelstein & Kubovcik

[57] ABSTRACT

A clutch lever engageable with a release bearing includes a portion supported by a first stationary fulcrum and an extension (3a) extending beyond the first fulcrum. The extension (3a) includes an end remote from the release bearing for contact with a second stationary fulcrum. The end of the extension is spaced from the second fulcrum before the clutch reaches a predetermined released condition in a releasing operation and engages the second fulcrum after the clutch reaches the predetermined condition for increasing the released spacing between the clutch facing and the flywheel and pressure plate.

3 Claims, 3 Drawing Sheets

RELEASE MECHANISM FOR A CLUTCH

TECHNICAL FIELD

The present invention relates to a release mechanism for releasing or disengaging a friction clutch applicable in automobiles or other vehicles and, more particularly, to a release mechanism for preventing drag or creep after the clutch is released.

BACKGROUND ART

In the conventional clutch mechanism, a release bearing for engaging and disengaging the clutch is supported by a stationary cylindrical support shaft which also supports the shaft on which the clutch disc is splined. A clutch lever or release fork is disposed substantially perpendicular to the shaft and is engaged at a rear face, at one end to one side of, for example below, the release bearing with an operation rod and is engaged at a rear face, at its other end to the other side, for example above, the release bearing with a stationary fulcrum. The lever has a pressing point, at its front face intermediate its ends, for pressing the release bearing to disengage the clutch.

When a clutch pedal (not shown) is depressed to release the clutch, the operating rod is advanced forwardly, toward the clutch, so that the clutch lever is pressed inwardly around the stationary fulcrum pushing the release bearing forwardly and the clutch is released. FIG. 4 illustrates a relationship between a clutch pedal stroke and an effective release stroke, i.e., movement of the release bearing. As illustrated therein, in a process in which the clutch pedal stroke increases, the movement of the release bearing initially increases slowly and curvedly due to loss in motion of the respective parts, and then increases substantially linearly.

When the pedal stroke increases after the clutch is substantially fully released, in section "a" in FIG. 4, the increasing ratio of the effective stroke remains the same. In the conventional clutch, there are only small spaces between a friction facing 6 at a radially outer portion of a clutch disc 5 and a flywheel 7 and between the facing 6 and a pressure plate 8 when the clutch is released. Therefore, if a driver revs up an engine during stoppage, e.g., at a traffice signal, the flywheel 7 may contact the facing 6 due to its axial oscillation as indicated by an arrow X2, FIG. 1, which causes a drag phenomenon or creep phenomenon. Such oscillation of the flywheel is caused by the crank shaft (not shown) of the engine which receives a reciprocating force from pistons of the engine. This oscillation causes the surface of the flywheel and/or a surface of the pressure plate rigidly fixed to the flywheel to intermittently contact the facing of the clutch.

Accordingly, it is an object of the invention to provide a release mechanism in which an effective stroke of the clutch lever relatively rapidly increases after a clutch pedal stroke which disengages the clutch, i.e., the effective stroke increases to a predetermined value so that a clutch can be more fully released.

DISCLOSURE OF THE INVENTION

According to the invention, a release mechanism of a clutch comprises a release bearing supported by a support shaft, a clutch lever perpendicular to the support shaft and provided at an intermediate portion with a pressing point axially engageable with the release bearing, an operation rod engaging an end of the clutch lever for axially applying a release force to the lever, a first stationary fulcrum supporting a portion of the clutch lever opposite to its operation rod with the support shaft and release bearings therebetween; characterized in that the clutch lever has an extension extending beyond the first fulcrum, the extension including an end remote from the rod and the clutch bearing support shaft shaft, and a second stationary fulcrum, the extension being spaced from the second fulcrum before the clutch reaches a predetermined released condition in a releasing operation and and engages the second fulcrum after the clutch reaches the predetermined released condition for increasing the clutch release spacing between the clutch and the flywheel and pressure plate.

BRIEF DESCRIPTION OF THE INVENTION

BEST MODE FOR CARRYING OUT THE INVENTION

Figure 1:
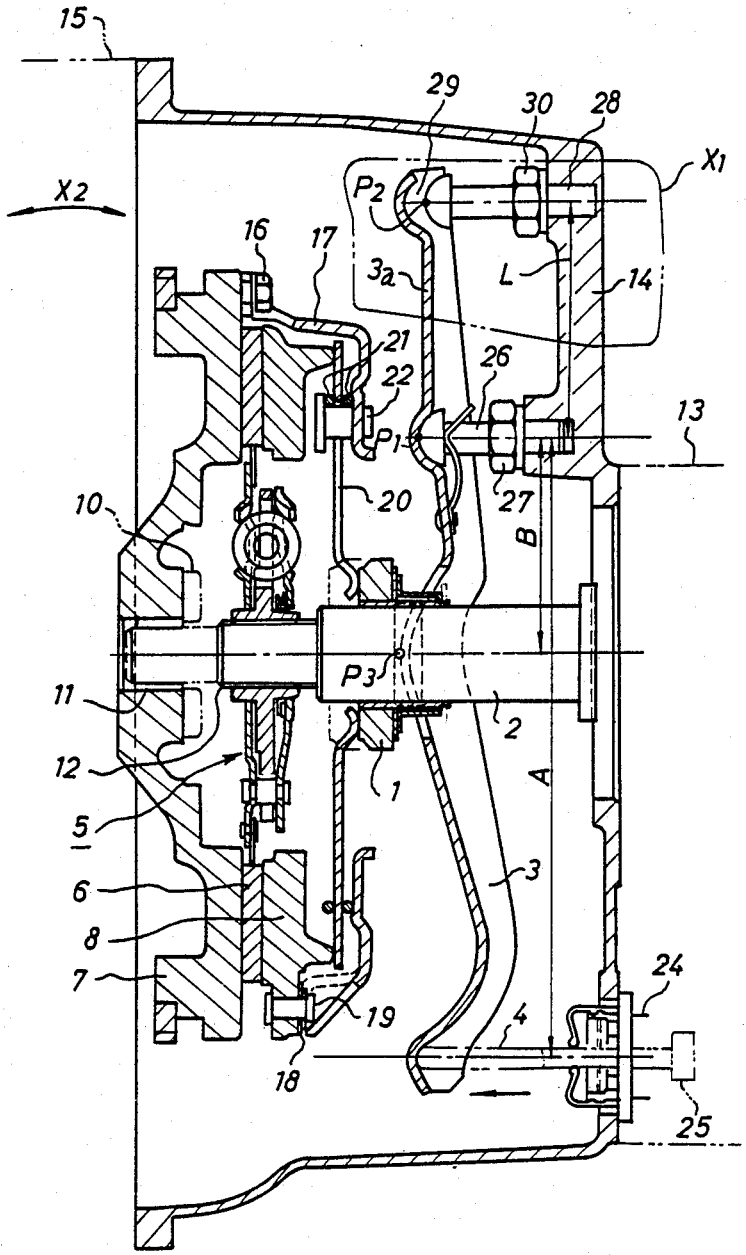
FIG. 1 is a sectional view of an embodiment of the invention during the initial clutch releasing operation.
Figure 2:
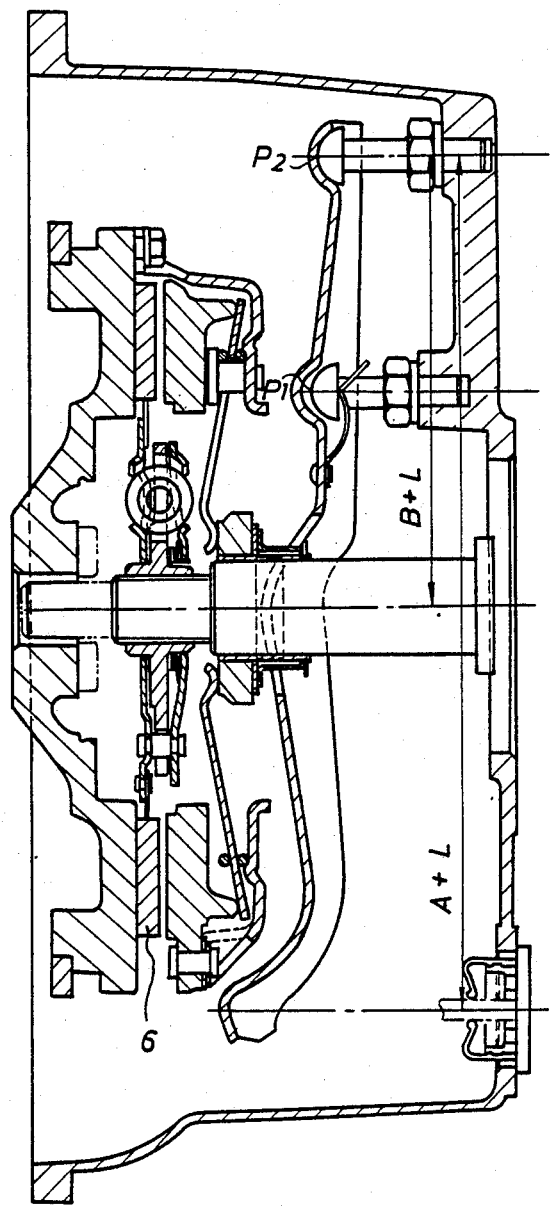
FIG. 2 is a sectional view of the embodiment of FIG. 1 with the clutch in fully released condition.

Referring to FIG. 1, a flywheel 7 is fixed to a crank shaft (not shown) of an engine by a plurality of bolts 10. The flywheel 7 may support a free end of a driven shaft 12 through a bearing 11. The driven shaft 12 supports a clutch disc 5 through a spline and extends through a stationary cylindrical shaft 2 into a transmission case 13 to form a input shaft of a transmission. The transmission case 13 is fixed to a clutch housing 14 fixed to a cylinder block 15 of the engine.

A clutch cover 17 is fixed to an end surface of the flywheel 7 by a plurality of bolts 16. A pressure plate 8 is connected to the clutch cover 17 by tangential straps 18 fixed thereto by rivets 19 so that the pressure plate 8 rotates together with the clutch cover 17. The pressure plate 8 adapted to be forced by a diaphragm spring 20 so as to press a friction facing 6 onto the flywheel 7. The diaphragm spring 20 is supported through a pair of wire rings 21 by circumferentially spaced axial bolts 22 fixed to the clutch cover 17. The radially inner portion of the diaphragm spring 20 is adapted to engage a release bearing 1.

An operation rod 4 engages a rear surface of an end of a clutch lever 3 and is connected to a piston 25 in an operation cylinder 24 fixed to the clutch housing 14. The operation cylinder 24 is connected through a high pressure pipe (not shown) to a master cylinder (not shown) for generating a hydraulic pressure when a clutch pedal is depressed. Thus, the rod 4 moves in a direction indicated by an arrow when the clutch pedal is depressed.

A first fulcrum P1 is formed by a pivot bolt 26, which is screwed into the clutch housing 14 and is adjustably fixed by a nut 27. The fulcrum P1 supports a portion of the lever 3 opposite to the rod 4 with the pressing point P3 therebetween.

In the present invention, the clutch lever 3 has an extension 3a projecting beyond the first fulcrum P1. The rear surface of the end of the extension 3a is faced toward a second fulcrum point P2 formed by a pivot bolt 28 and an axial space 29 is formed therebetween when the clutch is engaged. The bolt 28 is also screwed into the clutch housing 14 and is adjustably fixed thereto by a nut 30.

FIG. 1 illustrates a condition in which the clutch pedal is in half-stepped position. When the rod 4 moves forward as indicated by the arrow, the clutch lever 3 turns clockwise around the first fulcrum P1 to push the release bearing 1 forward. The diaphragm spring 20 is then deflected around the wire ring 21 to move the pressure plate 8 rearward. The pressure against the facing 6 is thus reduced and the clutch is released. The clutch lever 3 turns clockwise to a position in which the end of the extension 3a contact the second fulcrum P2, when the clutch is release to some extent, e.g., immediately before the clutch is fully released.

Figure 3:
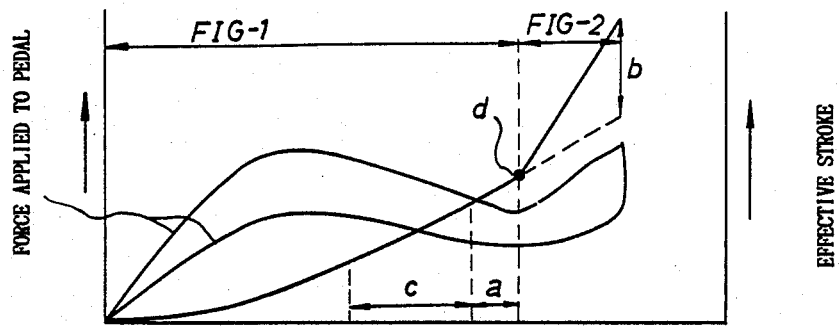
FIG. 3 is a graph illustrating a relationship between a pedal stroke and an effective stroke in the embodiment of the invention.
Figure 4:
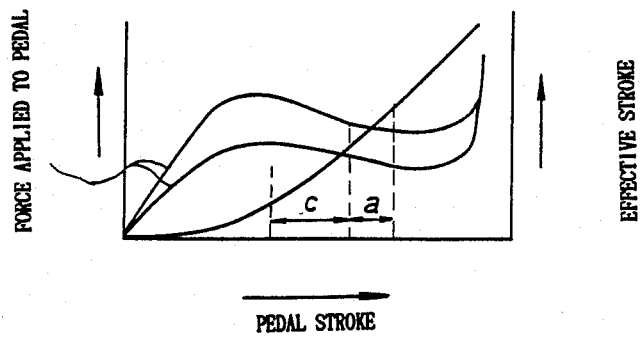
FIG. 4 is a graph illustrating a relationship between a pedal stroke and an effective stroke in a conventional mechanism.

In a further operation in which the clutch pedal is further depressed to reach a floor or a stopper, the clutch lever 3 pivots about the second fulcrum P2. Thus the leverage of the lever 3 increases. Therefore, in this operation after the actual release of the clutch, the pressure plate 8 moves a greater distance away from the facing 6, and thus, the clutch is more fully and more sufficiently released. That is; because the effective stroke (stroke of the pressing point P3) shown by a solid line in FIG. 3 increases more rapidly than that (shown by a broken line) of the conventional structure after the clutch is nearly fully released at a point d, large spaces are formed at opposite sides of facing 6, particularly at the rear side, in accordance with the increase of the pedal stroke. This can also be apparent from the following formula, in which letters indicate sizes or distances shown in FIG. 1, respectively.

$$(B+L)/(A+L)-B/A=(AB+AL-AB-BL)/A(A+L)=(A-B)L/A(A+L)>0$$

According to the invention, as described hereinbefore, in the releasing operation of the clutch pedal or other appropriate means after the clutch is released to some extent, the effective stroke of the clutch lever is larger than that of the conventional lever, so that the pressure plate moves a longer distance. Thus, the clutch can be released sufficiently, which prevents a drag phenomenon and creep phenomenon. That is; the present invention can provide a clutch having excellent releasability.

Further, in the engaging operation (e.g., at a point c in FIG. 3), the characteristic of the operation of the clutch lever, and thus, of the release mechanism, is maintained so as to be the same as that of the conventional mechanism, and the driver can operate the clutch smoothly.

Because the radial distance B between the first fulcrum P1 and the point P3 does not not affect the fully released condition of the clutch, the distance B can be short. Thus, the rate of A/B (B is a radial distance between the fulcrum P1 and the rod 4) can be large. The release bearing 1 and the clutch disk 5 can be controlled delicately, and the clutch can be engaged smoothly even if the disk 5 itself does not have an axial cushioning effect.

INDUSTRIAL APPLICABILITY

As will be apparent from the above description, the present invention can be advantageously applied to a friction clutch for automobiles and others, and particularly, to a clutch in which it is desired to effectively prevent the drag phenomenon and creep phenomenon.

What is claimed is:

1. A release mechanism of a clutch comprising a release bearing (1) supported by a support shaft, a clutch lever (3) perpendicular to said shaft and provided at an intermediate portion with a pressing point (P3) axially engageable with said release bearing (1), an operation rod (4) engaging an end of said lever (3) for axially applying a release force to the lever, and a first stationary fulcrum (P1) supporting a portion of said lever opposite to said operation rod with said support shaft therebetween;

characterized in that;

said clutch lever having an extension (3a) extending beyond said first fulcrum (P1), said extension (3a) including an end remote from said rod and said shaft, which is adapted to be supported by a second stationary fulcrum (P2), and said end of said extension (3a) adapted to be spaced from the second fulcrum (P2) before the clutch reaches a predetermined released condition in a releasing operation and to engage the second fulcrum (P2) after the clutch reaches said predetermined condition.

2. A release mechanism of claim 1 wherein said first and second fulcrum (P1, P2) are formed by bolts screwed into a clutch housing (14).

3. A release mechanism of claim 1 wherein said operation rod (4) is connected to a piston 25 in an operation cylinder (24).

* * * * *